United States Patent [19]

Rupp

[11] Patent Number: 5,321,808
[45] Date of Patent: Jun. 14, 1994

[54] DUAL PROCESS DISPLAY SERVER

[75] Inventor: Lawrence E. Rupp, Loveland, Colo.

[73] Assignee: Hewlett-Packard Company, Palo Alto, Calif.

[21] Appl. No.: 855,188

[22] Filed: Mar. 20, 1992

[51] Int. Cl.$^5$ .............................................. G06F 3/00
[52] U.S. Cl. .................................................. 395/164
[58] Field of Search ............................... 395/162-166; 340/721, 723, 747

[56] References Cited

U.S. PATENT DOCUMENTS 4,761,642  8/1988  Huntzinger ........................ 340/721

OTHER PUBLICATIONS

Rost et al., "PEX: A Network-Transparent 3D Graphics System," IEEE Computer Graphics & Applications pp. 14-26 (1989).
John Allen Smith, "The Multi-Threaded X Server," The Annual X Technical Conference, The X Resource I, pp. 73-89, Winter 1992.

*Primary Examiner*—Robert L. Richardson

[57] ABSTRACT

A dual process display server comprising a first memory; a second memory; a first process for receiving requests from a client program, dispatching client requests falling within a first prescribed category of requests, storing in the first memory requests falling within a second prescribed category of requests and storing in the second memory messages associated with requests stored in the first memory; and a second process for retrieving messages from the second memory, retrieving client requests from the first memory, and dispatching requests retrieved from the first memory in accordance with messages retrieved from the second memory.

15 Claims, 7 Drawing Sheets

DUAL PROCESS DISPLAY SERVER

FIELD OF THE INVENTION

The present invention is generally related to the field of computer graphics and is more particularly related to a dual process display server for use in a network operating under an X/PEX Window regime.

BACKGROUND OF THE INVENTION

The X Window System is a network-transparent windowing system developed at the Massachusetts Institute of Technology. X systems provide support for window management operations, input and simple two-dimensional (2D) graphics operations. The X Window System, or X, has become a de facto industry standard in the raster-graphics workstation marketplace because it works well in the common computing environment comprising a network of dissimilar workstations. However, despite its popularity X still has some shortcomings. Its developers deliberately concentrated on solving the problems encountered in supporting windowing, input and simple 2D graphics output operations in the heterogeneous network environment, and deferred other difficult problems, such as providing direct support for three-dimensional (3D) graphics and image processing.

PEX is an extension to the core X Window System that provides 3D graphics support in an X environment. PEX is designed to efficiently support 3D graphics standards (PHIGS, GKS-3D, and the majority of the proposed PHIGS+ extension to PHIGS) in an X environment.

Figure 1A:
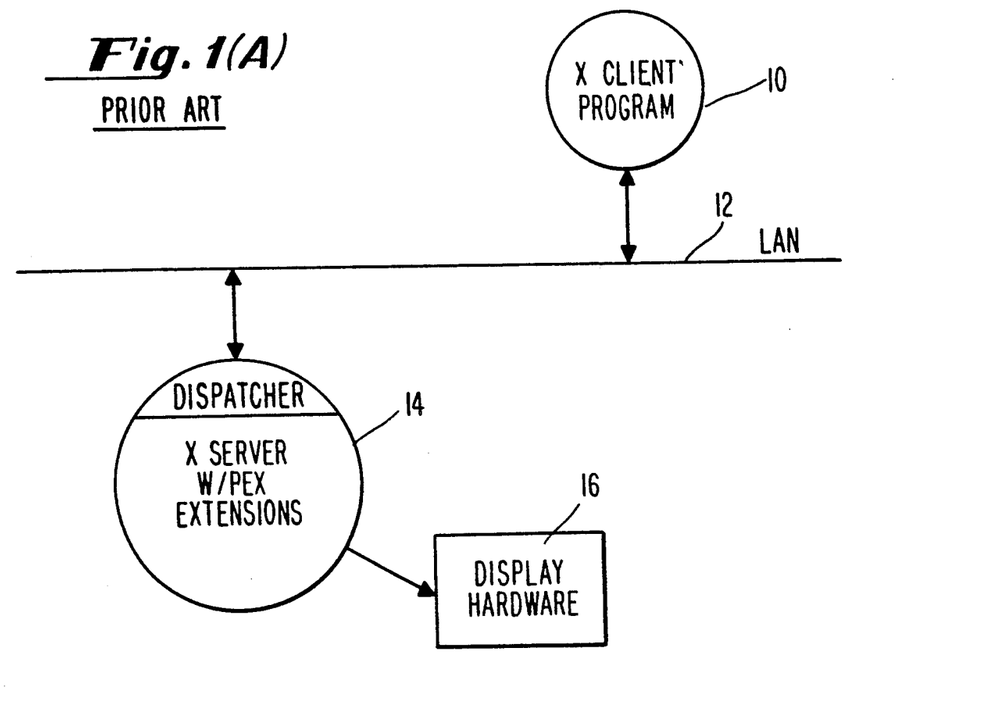
FIG. 1(A) schematically depicts a computer network comprising a prior art single process X/PEX display server.
Figure 1B:
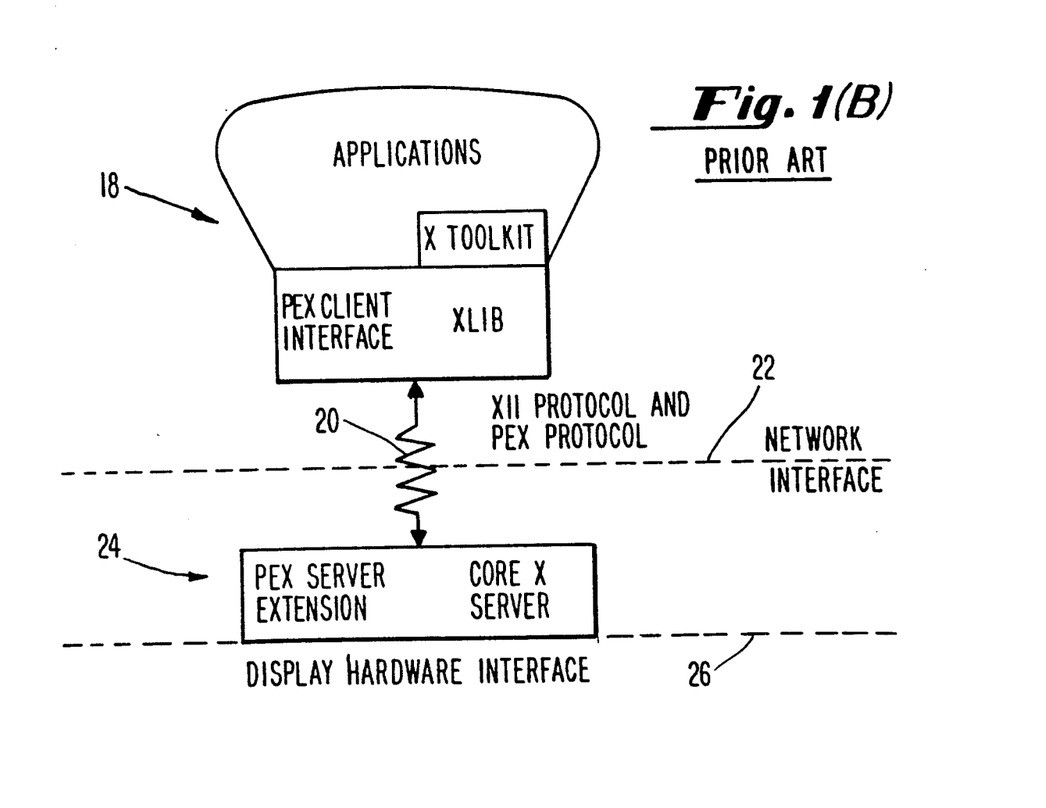
FIG. 1(B) schematically depicts a prior art X/PEX system model.

The X Window System is a client/server system, as shown in FIGS. 1(A) and 1(B). FIG. 1(A) schematically depicts a computer network comprising a first workstation running an application program (X client program) 10, a local area network (LAN) 12, a single process X Window display server with PEX extensions 14, and display hardware 16.

FIG. 1(B) schematically depicts an X/PEX system model comprising an application process, or client, 18, an X/PEX communication protocol 20, a network interface 22, an X server process 24 and a display hardware interface 26. The X server process 24 contains a core X server and any extensions. The X server process continuously runs on the display system; it is responsible for receiving and executing requests from all client processes and for reporting asynchronous events back to any interested clients. Clients can establish a connection and send requests to any device on the network that is executing an X server process. Communications between clients and servers are carried out using an existing interprocess communication protocol (e.g., TCP/IP, DECnet, or Unix sockets). The nature of the information passed between clients and servers is strictly defined by the X protocol specification and the protocol specifications for any extensions.

The strict definition of the X communication protocol provides network transparency. If all client and server processes strictly adhere to the protocol, a client process on one machine can send requests to a server process on any machine on the network, regardless of the CPU, operating system or architecture of either of the two machines. Similarly, a server process can execute requests issued by any client on the network, as long as the requests conform to the X protocol. This can make the fact that the two machines are connected via a network "transparent" to the user. Client applications can be written in such a way that they can access any X server on the network without being rewritten, recompiled or relinked.

FIG. 1(B) shows how data flows from the application down to the target display device. It is possible to build either PHIGS/PHIGS+ or GKS-3D programming interface libraries on top of PEX. An application can make calls to PHIGS/PHIGS+, GKS-3D, Xlib and X Toolkit libraries. These libraries in turn will format PEX and X protocol request packets and send them to the designated server process to be executed. The core X server receives and dispatches all incoming requests and hands PEX requests over to the PEX server extension to be processed. The X server and the PEX server extension can issue commands that cause primitives to be drawn on the display screen.

PEX operations obey the execution semantics defined by X. These state the following:
1. Each request is considered atomic (indivisible).
2. There is no implied scheduling between requests received via separate connections.
3. Requests received over a single connection are executed in the order they are received.

Most X server implementations are single-threaded and thus by definition follow the X execution semantics. However, such PEX operations as structure traversal and rendering may take considerable time to complete. This can lead to unacceptable behavior from a client's point of view. For example, a client that initiates a structure traversal can monopolize the server's ability to process requests, effectively preventing another client from doing simple text editing in another window. Multi-threaded servers may avoid this behavior by allowing other requests to be processed while lengthy operations are occurring. A connection will block if a request requires access to a resource that is already engaged in a lengthy operation. After the lengthy operation is completed the connection will unblock and the request will be processed. For instance, if a client initiates a structure traversal and then reads back the pixels using a core X request, the "read pixels" operation will not occur until the traversal has completed. On the other hand, an application performing lengthy rendering operations and a text-editing application may be supported simultaneously if they are operating in independent windows on the display.

The operation of a single process X/PEX display server will now be explained with reference to FIGS. 1(A), 2 and 3.

Requests for X and PEX services originating from the client program 10 are transmitted across the local area network 12 and arrive at the server 14. The requests, after being processed by the server, may result in modification of server data structures, generation of responses to the client program or changes to the appearance of the image on the display hardware screen.

Figure 2:
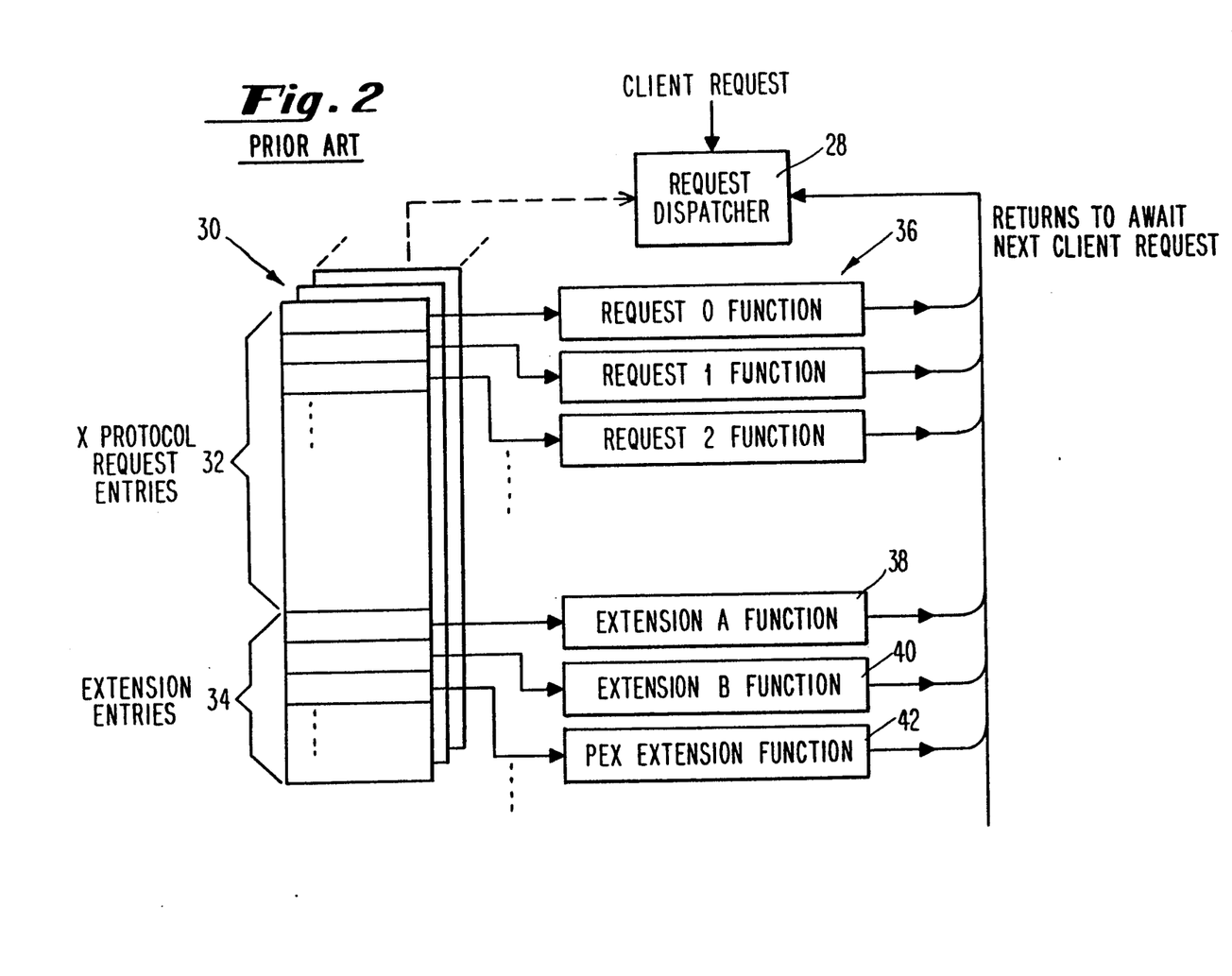
FIG. 2 schematically depicts a system for dispatching X Window requests in accordance with the prior art.

FIG. 2 schematically depicts a system for dispatching X Window requests. The system comprises a request dispatcher 28 and a set of dispatch tables 30, e.g., one table for each client connection. (Note that the X server is structured such that there can be a unique dispatch table for each client, however in most server implementations there is actually a single dispatch table that is shared by all clients). Each table 30 comprises a first part 32 containing a list of addresses of core X request servicing functions 36 and a second part 34 containing a list of addresses of extension request servicing functions 38, 40, 42. In the exemplary system of FIG. 2, function 42 corresponds to a PEX extension request.

The dispatcher 28 sits idle, waiting for a client request to arrive, when the server is not occupied with a request. When a request arrives, the client that originated the request is identified and the specific protocol service requested is determined. The identity of the client is used to address the client's dispatch table from the set of tables 30. Once the request is identified and the address of the request servicing function is determined, that function is called and it performs operations required to service the request. An error response message will be sent to the client that originated the request if an error is encountered while executing a request servicing function. When the request servicing function is finished executing, control is returned to the request dispatcher 28 to await the next client request. Note that the display server has a single thread of execution; once the request servicing function is called, its execution continues to completion. Any messages sent back to the client, whether in response to a request or due to an error, are completed before returning to the request dispatcher 28.

Figure 3:
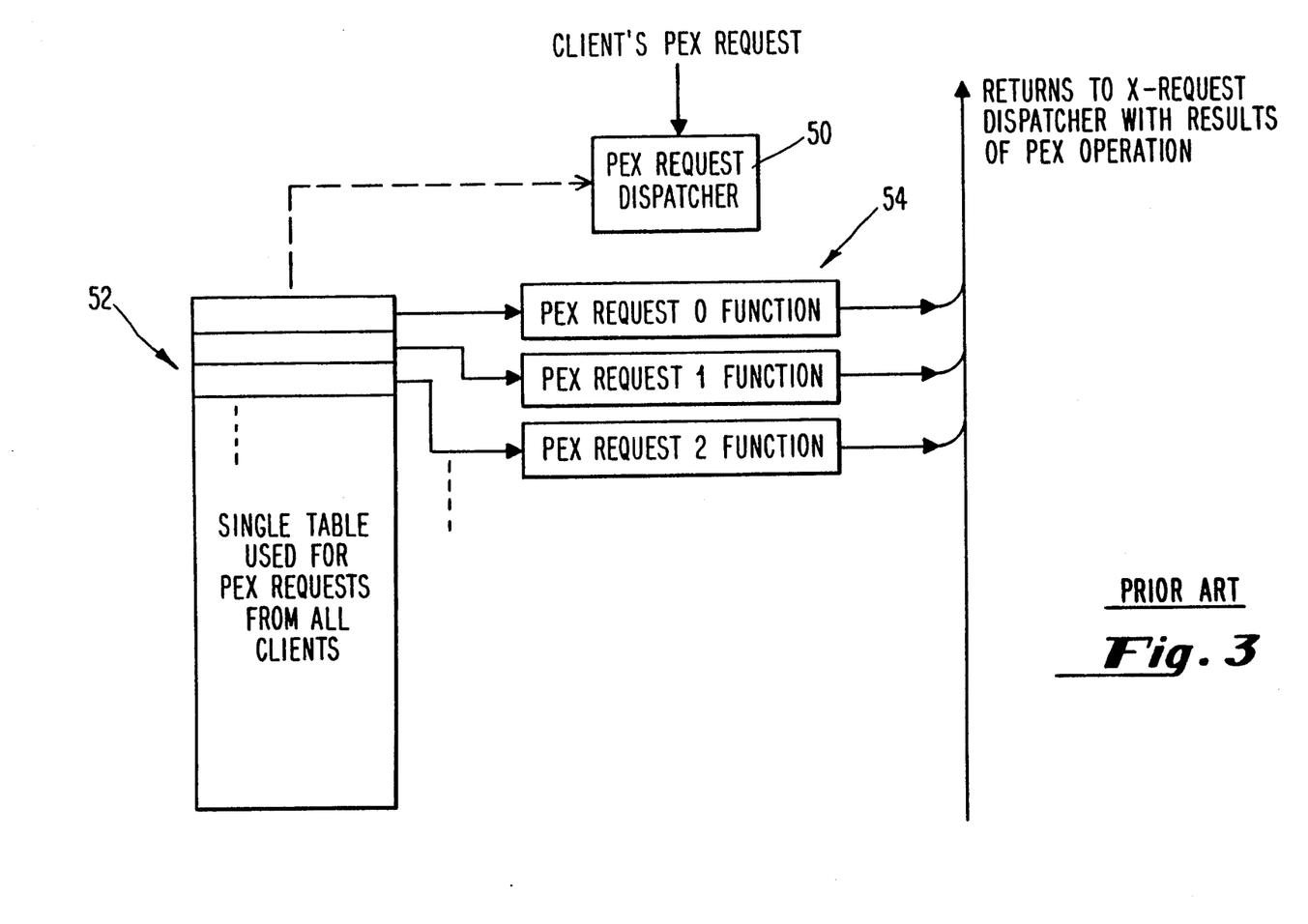
FIG. 3 schematically depicts a system for dispatching PEX requests in accordance with the prior art.

FIG. 3 schematically depicts a system for dispatching PEX requests. This system includes a PEX request dispatcher 50 and a single table 52 of addresses of PEX request servicing functions 54. The server's single thread of execution is directed to the PEX request dispatcher 50 whenever a client requests any type of PEX extension operation, thereby invoking the PEX request servicing function 42 (FIG. 2). The PEX request servicing function 42 is invoked as a result of the request dispatcher 28 recognizing the PEX extension request and calling the PEX extension function 42.

The system of FIG. 3 further refines the client's request to determine the particular PEX function that is needed. A process similar to the one described above for X request dispatching takes place at this level. The PEX request servicing functions 54, like the X request servicing functions 36 (FIG. 2), execute in a single thread until completion, and then return control to the request dispatcher 28. The PEX functions may also send messages back to the client.

A major shortcoming of prior art systems of the type described above is that in such systems servicing of core X and PEX requests is handled by a single software process executing on the computer acting as the display server. Request servicing functions are scheduled (dispatched) in the order in which the corresponding requests arrive, with each request commanding the full attention of the display server process until the request has been fully serviced. This regime diminishes the interactivity of the system because PEX requests typically require substantially more time to service than core X requests.

SUMMARY OF THE INVENTION

Accordingly, a primary object of the present invention is to provide systems (e.g., servers) for efficiently servicing client requests in an X Window or similar environment while maintaining a high degree of interactivity while servicing requests that require many clock cycles to satisfy. A further object of the invention is to provide a server that will be transparent to its clients, in the sense that the clients will not be required to do anything more than they already do when issuing a request.

The present invention achieves these goals by providing a dual process display server comprising first and second memories; a first process comprising means for receiving requests from a client program, first request dispatcher means for dispatching client requests falling within a first prescribed category of requests, and second request dispatcher means for storing in the first memory requests falling within a second prescribed category of requests and for storing in the second memory messages associated with requests stored in the first memory; and a second process comprising means for retrieving messages from the second memory, means for retrieving client requests from the first memory, and message dispatcher means for dispatching requests retrieved from the first memory in accordance with messages retrieved from the second memory.

Preferred embodiments of the invention further comprise a third memory, means associated with the second process for storing messages in the third memory, and second message dispatcher means associated with the first process for retrieving messages from the third memory and dispatching said messages. The second request dispatching means may advantageously comprise means for carrying out the following steps in response to the receipt of a request from a client: determining whether the second process is idle; enqueueing the request if the second process is not idle; if the second process is idle, storing the request in the first memory and storing in the second memory a message indicating that the request has been stored in the first memory; and blocking further requests from that client.

Preferred embodiments of a server in accordance with the invention are adapted to operate in an X Window environment. In such embodiments the said first category encompasses core X Window requests and the said second category encompasses PEX requests. In addition, preferred embodiments comprise means for unblocking a client that has issued a PEX request upon the second process completing the servicing of that PEX request.

An especially preferred application of the present invention is in a computer graphics system. Such a system comprises a local area network bus, a plurality of computers each of which is coupled to said bus and programmed to operate as an X Window System client program, a raster display, and a dual process display server (of the type described above) coupled to the bus and the raster display.

The present invention also provides methods for servicing client requests in a computer graphics system operating in accordance with the X Window protocol. Methods in accordance with the invention comprise the following steps: receiving requests from a client program into a first process; dispatching via said first process client requests falling within a first prescribed category of requests; storing in a first memory, via the first process, requests falling within a second prescribed category of requests; storing in a second memory, via the first process, messages associated with requests stored in the first memory; retrieving messages from the second memory into a second process; retrieving client requests from the first memory into the second process; and dispatching, via the second process, requests retrieved from the first memory in accordance with messages retrieved from the second memory.

As mentioned above, a preferred application of the present invention is in a network operating in accordance with the X Window System. One of the important features of the present invention is that it provides superior interactivity during the execution of PEX functions. The way that the present invention achieves this superiority is through double threading of the server. One thread of execution is dedicated to handling X (or core X) requests and another thread is dedicated to handling PEX requests. This use of two separate processes allows the server to continue to serve "normal" X clients while PEX clients are being served (e.g., while a large structure is being traversed). The underlying operating system is responsible for allocating processor cycles to the respective processes in equitable time slices so that no X clients block due to a time-consuming request from a PEX client.

It should also be noted that, even with double threading, the PEX server (the "second process") must still preserve atomicity of requests for a particular client (i.e., X and PEX requests for a particular client must be serviced in the order they are received). This condition is a requirement of the X protocol and any extension placed on the X protocol, including the PEX protocol extension.

Although PEX requests are serviced by a dedicated process, this detail of implementation is transparent to client processes using the dual process server. All protocol requests, whether for X or PEX services, are first received by the first, or X server, process. This process detects PEX extension requests and passes those requests on to the second, or PEX, process. To guarantee atomicity of a client's request stream, the server blocks further processing of that client's requests while a PEX request is being serviced by the second process. Blocking is done without regard to the type of request following the PEX request. To preserve the execution order of a client's request stream, the client's X requests are held until the servicing of a pending PEX request is complete. If this were not done, X requests would be able to outrun some of the more time-consuming PEX requests. In addition, while a client with a pending PEX request is blocked, the server continues to process non-PEX requests from other clients.

In preferred embodiments, the first and second processes communicate with each other via shared memory and FIFO queues. The first process uses shared memory to pass PEX requests and resource information to the second process, and the second process uses shared memory to pass messages back to the client. FIFO registers may also be used to coordinate asynchronous operations of the first and second processes. Other features and advantages of the present invention are described below.

DETAILED DESCRIPTION OF PREFERRED EMBODIMENTS

Figure 4:
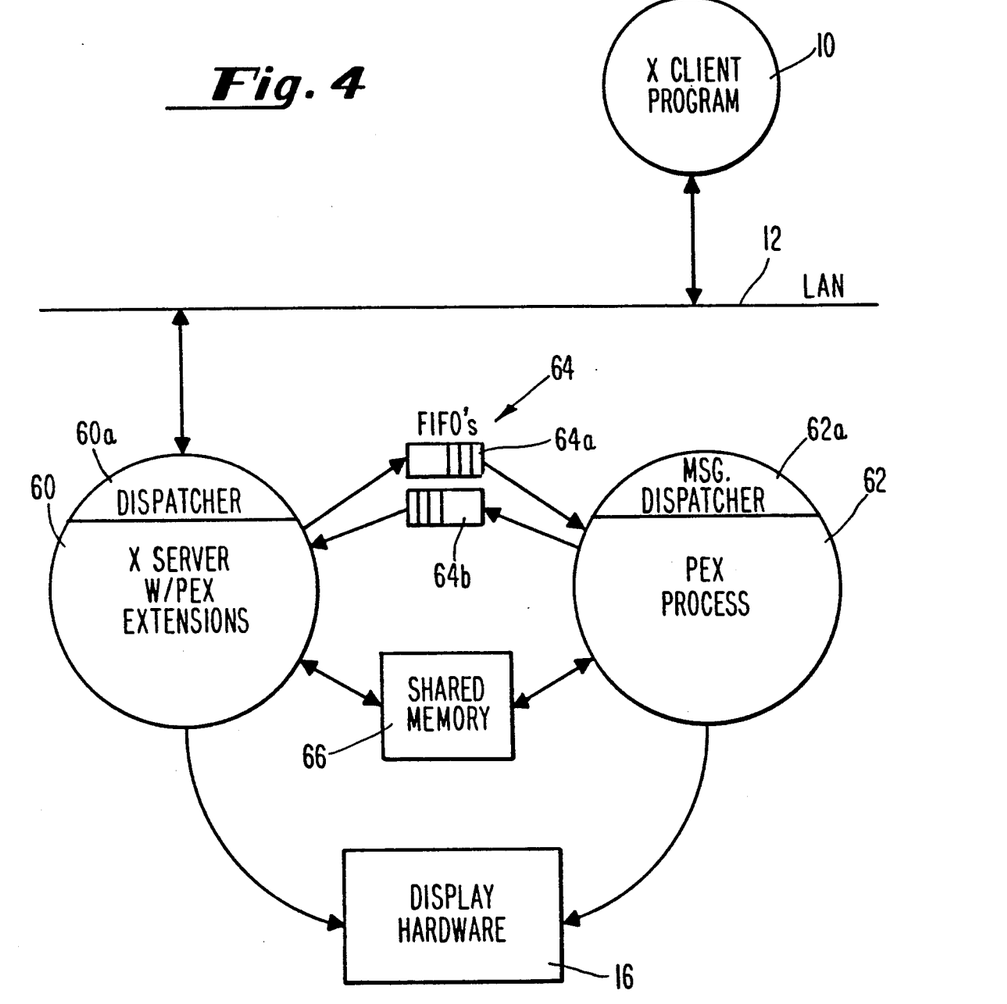
FIG. 4 schematically depicts a network comprising a dual process X/PEX display server in accordance with the present invention.

FIG. 4 schematically depicts a network comprising a dual process X/PEX display server in accordance with the present invention. This network, like the network of FIG. 1(A), comprises an X client program 10, LAN 12 and display hardware 16; however, instead of the single process display server 14 of the FIG. 1(A) network, the present invention employs first and second processes 60, 62, first-in-first-out (FIFO) registers 64 and shared memory (e.g., random access memory (RAM)) 66. The X client program 10 generates requests as described above. The requests are received by the X server (first process) 60 and dispatched by a request dispatcher to an appropriate request servicing function. The request dispatcher is similar to the dispatcher 28 discussed above in connection with FIGS. 1(A), 2 and 3, but it includes a PEX request dispatcher 60a that is different from the prior art PEX request dispatcher 50.

Figure 5:
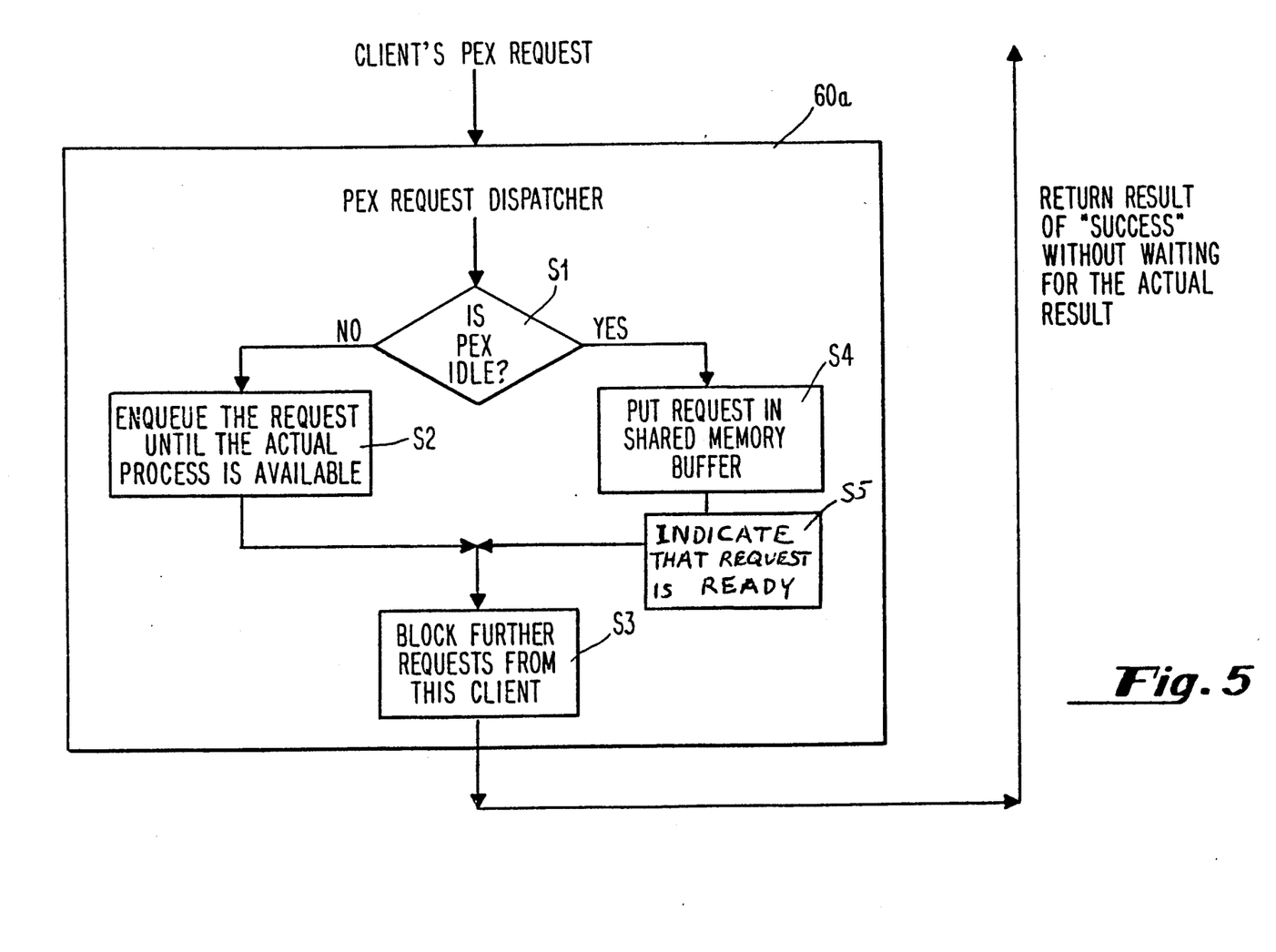
FIG. 5 is a flowchart depicting steps carried out by the first process in dispatching PEX requests.

FIG. 5 depicts steps carried out by the PEX request dispatcher 60a in dispatching PEX requests. When a PEX request is received, rather than a second level of dispatching taking place as in the prior art single process server 14 (FIG. 1(A)), the requests are passed on to the second process 62.

The PEX request dispatcher 60a first determines at step S1 whether or not the second PEX request servicing process 62 is idle (not busy). If the second PEX request servicing process 62 is already operating on a previously issued request from another client, the newly arrived request is enqueued at step S2 and will await servicing until the second process becomes available. If the second process 62 is idle, at step S4 the request for PEX services is put in memory buffer 66 (FIG. 4), which is shared by the first and second processes 60, 62, and at step S5 a message is sent from the first process 60 to the second process 62 via a FIFO register (or queue) 64a. This message may, e.g., indicate to the second process 62 that a PEX request is present and ready for processing.

Regardless of whether the second process 62 is presently idle (as determined at step S1), the requesting client is blocked from further attention at step S3. When a client is blocked, the request dispatcher will "ignore" any further communications from that client; however, the ignored requests are not discarded, but rather are saved until that client is unblocked at a later time. Blocking in this manner preserves atomicity of the request stream. This allows requests to be serviced in the order in which they are received, and avoids out of order execution of intermixed PEX and X requests.

After the request dispatcher has completed blocking the requesting client, it immediately returns control to the X server's dispatcher (which is not specifically shown in FIG. 4, but which is generally shown in FIG. 1(A)) and reports that the operation has been successfully completed. It does this without waiting for the actual result of the operation. This is done so that the first process 60 can continue to respond to requests that may be present from other client programs.

Figure 6:
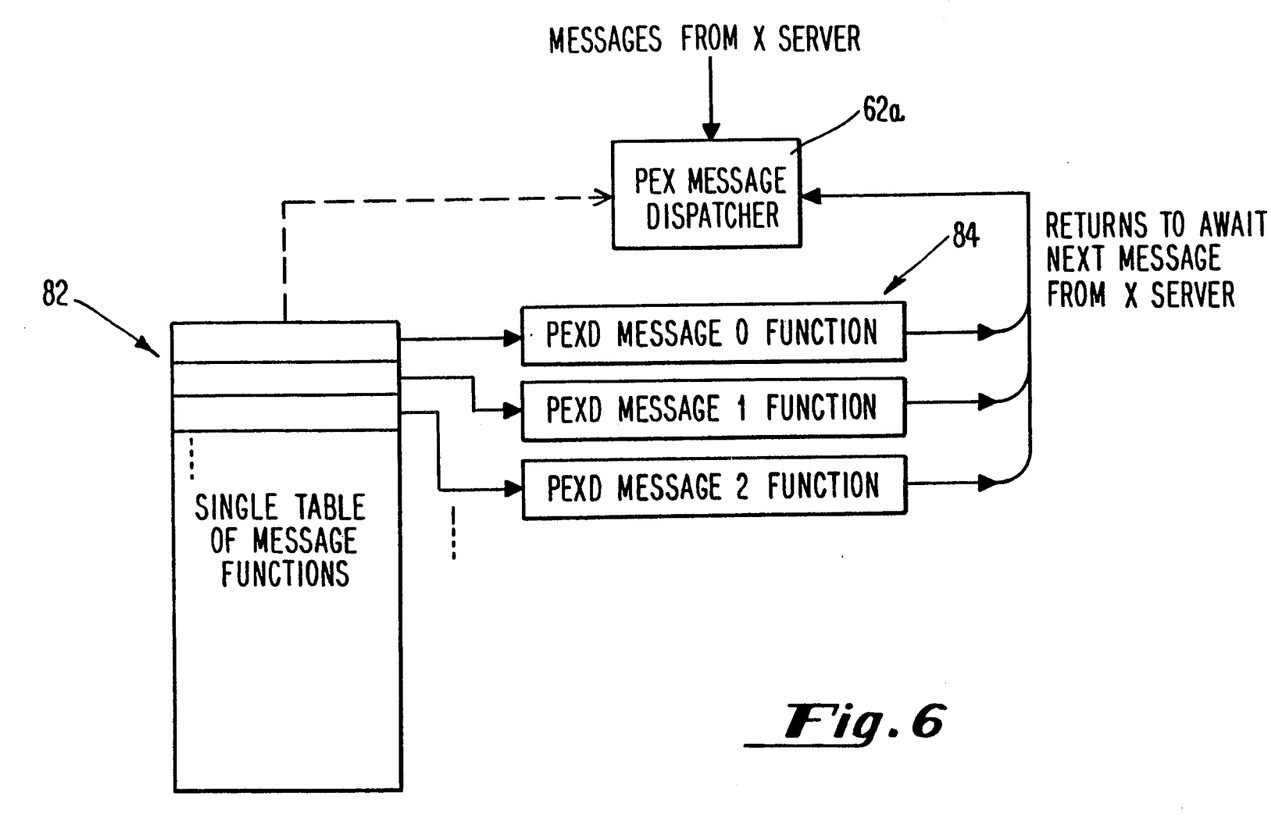
FIG. 6 schematically depicts a system for use by the second process for dispatching messages from the first process.

FIG. 6 schematically depicts a system for use by the second process 62 for dispatching messages from the first process 60. This figure specifically shows the processing by the second process 62 of messages that are received from the first process 60 via the communications FIFO 64a (FIG. 4). The system comprises a message dispatcher 62a and a table 82 of addresses of message servicing functions 84. The message dispatcher 62a normally sits idle, waiting for messages to arrive.

Messages sent by the first process 60 to the second process 62 include:
DISPATCH
INITIALIZE
RESET
REGISTERCODES
DESTROYWINDOW
FREECLIENTRESOURCES When one of these messages arrives, a dispatch process similar to that described above for X client requests takes place. The appropriate message function is called; this function responds in accordance with a prescribed program for that message and then returns control to the message dispatcher 62a. The message dispatcher 62a then returns to the state of waiting for a next message from the first process 60.

The DISPATCH message causes the second process 62 to examine the PEX request that the first process 60 placed in the shared memory buffer 66 (FIG. 4). The appropriate PEX function is called to provide the proper request services. This level of dispatching is similar to that provided in the single process server of the prior art, but in this case all of the PEX operations are performed by the second process 62. This allows the first process 60 to continue servicing X requests.

The INITIALIZE, RESET, and REGISTERCODES messages are used during startup and shutdown of the second process 62. The DESTROYWINDOW and FREECLIENTRESOURCES messages are sent by the first process 60 to alert the second process 62 of the possible abnormal termination of client programs.

One issue that arises in connection with the dual process server scheme of the present invention is how to return messages to a client that originated a PEX request. The resolution of this issue is made difficult by the fact that the thread of execution in the first process 60, with respect to that PEX client, will typically have been released by the time the message is to be sent to the client. This is because the request dispatcher 60a will have been reentered and led to believe that the requested PEX operation was successfully completed, when in fact it may not have actually begun yet. This problem is solved through messages that are sent back from the second process 62 to the first process 60.

The messages sent by the second process 62 to the first process 60 include:
IDLE
WRITE
ERROR
EVENT
GETDRAWABLE The IDLE message is sent to the first process 60 via FIFO register 64b when the second process 62 is ready to service new requests. The first process 60, upon receiving this message, unblocks the client that issued the last request sent to the second process 62. The first process 60 also checks for any client that has been enqueued because its PEX request arrived while the second process was busy. If such a client is found, that client's PEX request is passed to the second process 62 and a DISPATCH message is sent to FIFO register 64a. Any previously enqueued client is not unblocked at this time. Unblocking will occur when the second process 62 sends an IDLE message to FIFO register 64b after servicing the client's PEX request.

The WRITE, ERROR and EVENT messages instruct the first process 60 to transmit response messages back to the requesting client program. To the client program these messages are indistinguishable from those that would be generated in the single process display server of the prior art. The GETDRAWABLE message is used to determine characteristics of display objects used by the second process 62. This information is obtained as it is needed by the second process.

Figure 7:
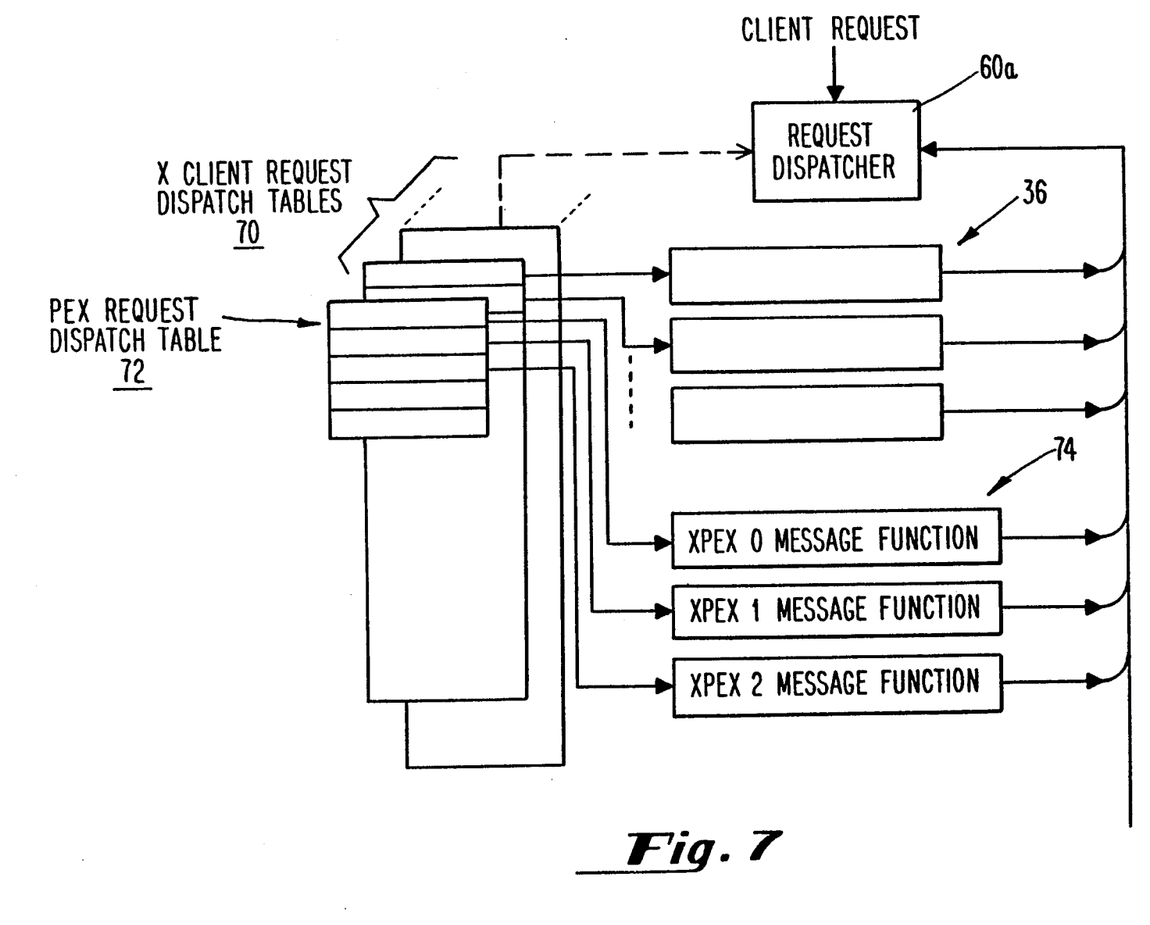
FIG. 7 schematically depicts a system for use by the first process for dispatching both X protocol requests from a client program and messages from the second process.

FIG. 7 schematically depicts a system for use by the first process 60 for dispatching both X protocol requests from a client program and messages from the second process 62. This system includes the request dispatcher 60a, a set of dispatch tables 70, each table containing a list of addresses of client request servicing functions 36, and a table 72 containing a list of addresses of message servicing functions 74. The message servicing functions 74 service messages from the second process 62 (FIG. 4). FIG. 7 particularly shows the features of the first process 60 that distinguish it from the single process 14 of the prior art single process server (FIGS. 1(A) and 2) and that allow it to respond to messages from the second process 62. The basic dispatching mechanism of the prior art is used, however in the present invention the second process 62 appears to the first process 60 as a special type of client program.

The second process' "pseudo-client" dispatch table 72 contains addresses of the IDLE, WRITE, ERROR, EVENT, and GETDRAWABLE service functions. Service functions for the response messages (WRITE, ERROR, EVENT) obtain data that is to be sent to the originating client from both the FIFO register 64b and the shared memory 66. The first process 60 responds to GETDRAWABLE messages by placing the requested information into the shared memory 66. It then indicates to the second process (e.g., through the shared memory) that the drawable information is available.

The foregoing description of exemplary embodiments of the present invention is not intended to limit the scope of protection provided by the following claims, which describe the invention in accordance with its true scope.

What is claimed is:

1. A dual process display server, comprising:
   (a) a first memory;
   (b) a second memory;
   (c) a first process comprising means for receiving requests from a client program, first request dispatcher means for dispatching client requests falling within a first prescribed category of requests, and second request dispatcher means for storing in said first memory requests falling within a second prescribed category of requests and for storing in said second memory messages associated with requests stored in said first memory; and
   (d) a second process comprising means for retrieving messages from said second memory, means for retrieving client requests from said first memory, and message dispatcher means for dispatching requests retrieved from said first memory in accordance with messages retrieved from said second memory.

2. A dual process display server as recited in claim 1, further comprising a third memory, means associated with said second process for storing messages in said third memory, and second message dispatcher means associated with said first process for retrieving messages from said third memory and dispatching said messages.

3. A dual process display server as recited in claim 2, wherein said second request dispatching means comprises means for carrying out the following steps in response to the receipt of a request from a client:
   (1) determining whether said second process is idle;
   (2) enqueueing said request if said second process is not idle;
   (3) if said second process is idle, storing said request in said first memory and storing in said second memory a message indicating that said request has been stored in said first memory; and
   (4) blocking further requests from that client.

4. A dual process display server as recited in claim 3, wherein said server is adapted to operate in an X Window environment, said first category encompasses core X Window requests and said second category encompasses PEX requests.

5. A dual process display server as recited in claim 4, further comprising means for unblocking a client that has issued a PEX request upon said second process completing the servicing of that PEX request.

6. A computer graphics system, comprising:
   (a) a local area network bus;
   (b) a plurality of computers each of which is coupled to said bus and programmed to operate as an X Window System client program;
   (c) a raster display; and
   (d) a dual process display server coupled to said bus and said raster display, said dual process display server comprising:
      (1) a first memory;
      (2) a second memory;
      (3) a first process comprising means for receiving requests from said client programs, first request dispatcher means for dispatching client requests falling within a first prescribed category of requests, and second request dispatcher means for storing in said first memory requests falling within a second prescribed category of requests and storing in said second memory messages associated with requests stored in said first memory; and
      (4) a second process comprising means for retrieving messages from said second memory, means for retrieving client requests from said first memory, and message dispatcher means for dispatching requests retrieved from said first memory in accordance with messages retrieved from said second memory.

7. A computer graphics system as recited in claim 6, further comprising a third memory, means associated with said second process for storing messages in said third memory, and second message dispatcher means associated with said first process for retrieving messages from said third memory and dispatching said messages.

8. A computer graphics system as recited in claim 7, wherein said second request dispatching means comprises means for carrying out the following steps in response to the receipt of a request from a client:
   (1) determining whether said second process is idle;
   (2) enqueueing said request if said second process is not idle;
   (3) if said second process is idle, storing said request in said first memory and storing in said second memory a message indicating that said request has been stored in said first memory; and
   (4) blocking further requests from that client.

9. A computer graphics system as recited in claim 8, wherein said first category encompasses core X Window requests and said second category encompasses PEX requests.

10. A computer graphics system as recited in claim 9, further comprising means for unblocking a client that has issued a PEX request upon said second process completing the servicing of that PEX request.

11. A method for servicing client requests in a computer graphics system operating in accordance with an X Window protocol, comprising the steps of:
   (a) receiving requests from a client program into a first process;
   (b) dispatching via said first process client requests falling within a first prescribed category of requests;
   (c) storing in a first memory, via said first process, requests falling within a second prescribed category of requests;
   (d) storing in a second memory, via said first process, messages associated with requests stored in said first memory;
   (e) retrieving messages from said second memory into a second process;
   (f) retrieving client requests from said first memory into said second process; and
   (g) dispatching, via said second process, requests retrieved from said first memory in accordance with messages retrieved from said second memory.

12. A method as described in claim 11, further comprising the steps of storing messages from said second process in a third memory, and retrieving messages from said third memory into said first process and dispatching said messages via said first process.

13. A method as described in claim 12, further comprising carrying out the following steps in response to the receipt from a client of a message falling within said second category:
   (1) determining whether said second process is idle;
   (2) enqueueing said request if said second process is not idle;
   (3) if said second process is idle, storing said request in said first memory and storing in said second memory a message indicating that said request has been stored in said first memory; and
   (4) blocking further requests from that client.

14. A method as described in claim 13, wherein said first category encompasses core X Window requests and said second category encompasses PEX requests.

15. A method as described in claim 14, further comprising the step of unblocking a client that has issued a PEX request upon said second process completing the servicing of that PEX request.

* * * * *